United States Patent
Ghosh et al.

(10) Patent No.: US 10,634,007 B2
(45) Date of Patent: Apr. 28, 2020

(54) ROTOR SUPPORT SYSTEM HAVING A SHAPE MEMORY ALLOY

(71) Applicant: GENERAL ELECTRIC COMPANY, Schenectady, NY (US)

(72) Inventors: Shuvajyoti Ghosh, Bangalore (IN); Ravindra Shankar Ganiger, Bangalore (IN); Praveen Sharma, Bangalore (IN); Ishita Sehgal, Bangalore (IN); Prashant Bhujabal, Bangalore (IN); Shivam Mittal, Bangalore (IN)

(73) Assignee: General Electric Company, Schenectady, NY (US)

(*) Notice: Subject to any disclaimer, the term of this patent is extended or adjusted under 35 U.S.C. 154(b) by 148 days.

(21) Appl. No.: 15/811,169

(22) Filed: Nov. 13, 2017

(65) Prior Publication Data

US 2019/0145277 A1 May 16, 2019

(51) Int. Cl.
*F01D 25/16* (2006.01)
*F16C 19/06* (2006.01)
*F16C 35/063* (2006.01)

(52) U.S. Cl.
CPC ............ *F01D 25/164* (2013.01); *F16C 19/06* (2013.01); *F16C 35/063* (2013.01); *F05D 2220/32* (2013.01); *F05D 2240/20* (2013.01); *F05D 2250/283* (2013.01); *F05D 2260/30* (2013.01); *F16C 2360/23* (2013.01)

(58) Field of Classification Search
CPC ............... F01D 25/164; F01D 25/162; F05D 2260/311; F05D 2260/30; F05D 2300/505; F05D 2250/283; F16C 35/063; F16C 19/06
See application file for complete search history.

(56) References Cited

U.S. PATENT DOCUMENTS

| | | | |
|---|---|---|---|
| 5,160,233 A | 11/1992 | McKinnis | |
| 5,366,254 A | 11/1994 | Tucchio et al. | |
| 6,796,408 B2 | 9/2004 | Sherwin et al. | |
| 7,097,413 B2 | 8/2006 | Vanduyn | |
| 7,216,831 B2 | 5/2007 | Wood | |
| 7,260,892 B2 * | 8/2007 | Schilling | F01D 25/16 29/434 |

(Continued)

OTHER PUBLICATIONS

Joshi et al.,"Turbine Bearing Support",,Pending in Patent Application Sr. No. 201641017921; Filing Date:May 25, 2016, 27 Pages.

(Continued)

*Primary Examiner* — Kenneth J Hansen
*Assistant Examiner* — Jackson N Gillenwaters
(74) *Attorney, Agent, or Firm* — Dority & Manning, P.A.

(57) ABSTRACT

A rotor support system for a gas turbine engine is disclosed. The rotor support system includes a bearing support flange, a frame support flange proximate to the bearing support flange, a fastener between the bearing support flange and the frame support flange, a damping component, and an axial retainer. The damping component includes a super-elastic shape memory alloy. The fastener is configured to fail when a load on the fastener exceeds a threshold value and the damping component is configured to deform from a normal state to a deformed state after the fastener fails. The axial retainer is configured to retain the bearing support flange and the frame support flange within an axial displacement from each other after the fastener fails. A radial gap exists between the bearing support flange and the frame support flange when the damping component is in the normal state.

21 Claims, 9 Drawing Sheets

(56) References Cited

U.S. PATENT DOCUMENTS

| | | | |
|---|---|---|---|
| 8,136,999 B2 | 3/2012 | Mons et al. | |
| 8,262,353 B2* | 9/2012 | Storace | F01D 21/04 |
| | | | 384/535 |
| 8,403,634 B2 | 3/2013 | Arness et al. | |
| 8,430,622 B2 | 4/2013 | Webster et al. | |
| 8,662,756 B2 | 3/2014 | Care et al. | |
| 8,814,097 B2 | 8/2014 | Schnitzer | |
| 9,140,137 B2 | 9/2015 | Mayer et al. | |
| 9,169,728 B2* | 10/2015 | Wallace | F01D 21/04 |
| 9,180,982 B2 | 11/2015 | Baghdasarian | |
| 9,777,596 B2* | 10/2017 | Raykowski | F16C 35/067 |
| 9,863,274 B2* | 1/2018 | Chilton | F01D 21/045 |
| 2006/0269357 A1 | 11/2006 | Webb | |
| 2008/0213062 A1 | 9/2008 | Johnson et al. | |
| 2010/0011493 A1 | 1/2010 | Wiig et al. | |
| 2011/0150378 A1 | 6/2011 | Care et al. | |
| 2013/0324343 A1 | 12/2013 | Gallet | |
| 2017/0234157 A1 | 8/2017 | Khan et al. | |

OTHER PUBLICATIONS

Ganiger et al.,"Method and System for Elastic Bearing Support",,Pending U.S. Appl. No. 15/331,121, filed Oct. 21, 2016, 27 Pages.

Ghosh et al.,"Load Reduction Assemblies for a Gas Turbine Engine",,Pending U.S. Appl. No. 15/331,158, filed Oct. 21, 2016, 31 Pages.

Ac et al.,"Support Assembly Having Variable Stiffness Member",,Pending in Patent Application Sr. No. 201741013386; Filing Date:Apr. 14, 2017, 37 Pages.

* cited by examiner

ROTOR SUPPORT SYSTEM HAVING A SHAPE MEMORY ALLOY

BACKGROUND

The present disclosure relates generally to gas turbine engines and, more particularly, to a rotor support system for a gas turbine engine having a shape memory alloy.

Gas turbine engines typically include a rotor assembly, a compressor, and a turbine. The rotor assembly includes a fan that has an array of fan blades extending radially outward from a rotor shaft. The rotor shaft transfers power and rotary motion from the turbine to both the compressor and the fan, and is supported longitudinally using a plurality of bearing assemblies. Additionally, the rotor assembly has an axis of rotation that passes through a rotor center of gravity. Known bearing assemblies include rolling elements and a paired race, wherein the rolling elements are supported within the paired race. To maintain a rotor critical speed margin, the rotor assembly is typically supported on three bearing assemblies, one of which is a thrust bearing assembly and the other two are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, sometimes a fragment of one of the fan blades may become separated from the remainder of the blade through fan blade out event. Accordingly, a substantial unbalanced rotary load may be created within the damaged fan thus creating substantial rotor imbalances. Such rotor imbalances must be carried substantially by shaft bearings, bearing supports, and support frames. Further, fan blade out may also cause the engine to operate with a lesser capability, necessitating repair.

To minimize the effects of potentially damaging, abnormal unbalanced loads, gas turbine engines often include support components for the fan rotor support system that are sized to provide additional strength. However, increasing the strength of the support components increases an overall weight of the engine and decreases an overall efficiency of the engine under its normal operation without substantial rotor imbalances. To address abnormal unbalanced load, the engines may also utilize a bearing support that includes a mechanically weakened section, or primary fuse, that decouples the fan rotor from the fan support system. During such events, the fan shaft seeks a new center of rotation that approximates that of its unbalanced center for gravity. This fuse section, in combination with a rotor free orbit allowance, is referred to as a load reduction device (LRD). The LRD reduces the rotating dynamic loads in the fan support system. However, with conventional LRDs, the fan rotor is permanently decoupled from the fan rotor support system when the primary fuse fails. As a result, subsequent operation of the gas turbine engine may be significantly impacted.

Accordingly, an improved rotor support system that is configured to accommodate unbalanced or increased loading conditions without resulting in a permanent decoupling of the fan rotor from the rotor support system would be desirable.

BRIEF DESCRIPTION

In one aspect, the present disclosure is directed to a rotor support system for a gas turbine engine. The rotor support system includes a bearing support flange, a frame support flange proximate to the bearing support flange, a fastener between the bearing support flange and the frame support flange, a damping component in contact with at least one of the bearing support flange or the frame support flange, and an axial retainer. The damping component includes a super-elastic shape memory alloy. The fastener is configured to fail when a load on the fastener exceeds a threshold value and the damping component is configured to deform from a normal state to a deformed state after the fastener fails. The axial retainer is configured to retain the bearing support flange and the frame support flange within an axial displacement from each other after the fastener fails. A radial gap exists between the bearing support flange and the frame support flange when the damping component is in the normal state.

In another aspect, the present disclosure is directed to a rotor support system for a gas turbine engine. The rotor support system includes a bearing support flange, a frame support flange proximate to the bearing support flange, a shear bolt that fastens the bearing support flange and the frame support flange, a damping component that is in contact with at least one of the bearing support flange or the frame support flange, and a retainer flange fastened to the frame support flange. The damping component includes a super-elastic shape memory alloy. The shear bolt is configured to fail when a load on the shear bolt exceeds a threshold value. The damping component is configured to deform from a normal state to a deformed state after the shear bolt fails. The retainer flange is configured to retain the bearing support flange and the frame support flange within an axial displacement from each other during and after the shear bolt fails. A radial gap and a circumferential gap exist between the bearing support flange and the frame support flange when the damping component is in the normal state.

BRIEF DESCRIPTION OF THE DRAWINGS

These and other features and aspects of embodiments of the present disclosure will become better understood when the following detailed description is read with reference to the accompanying drawings in which like characters represent like parts throughout the drawings.

DETAILED DESCRIPTION

Figure 1:
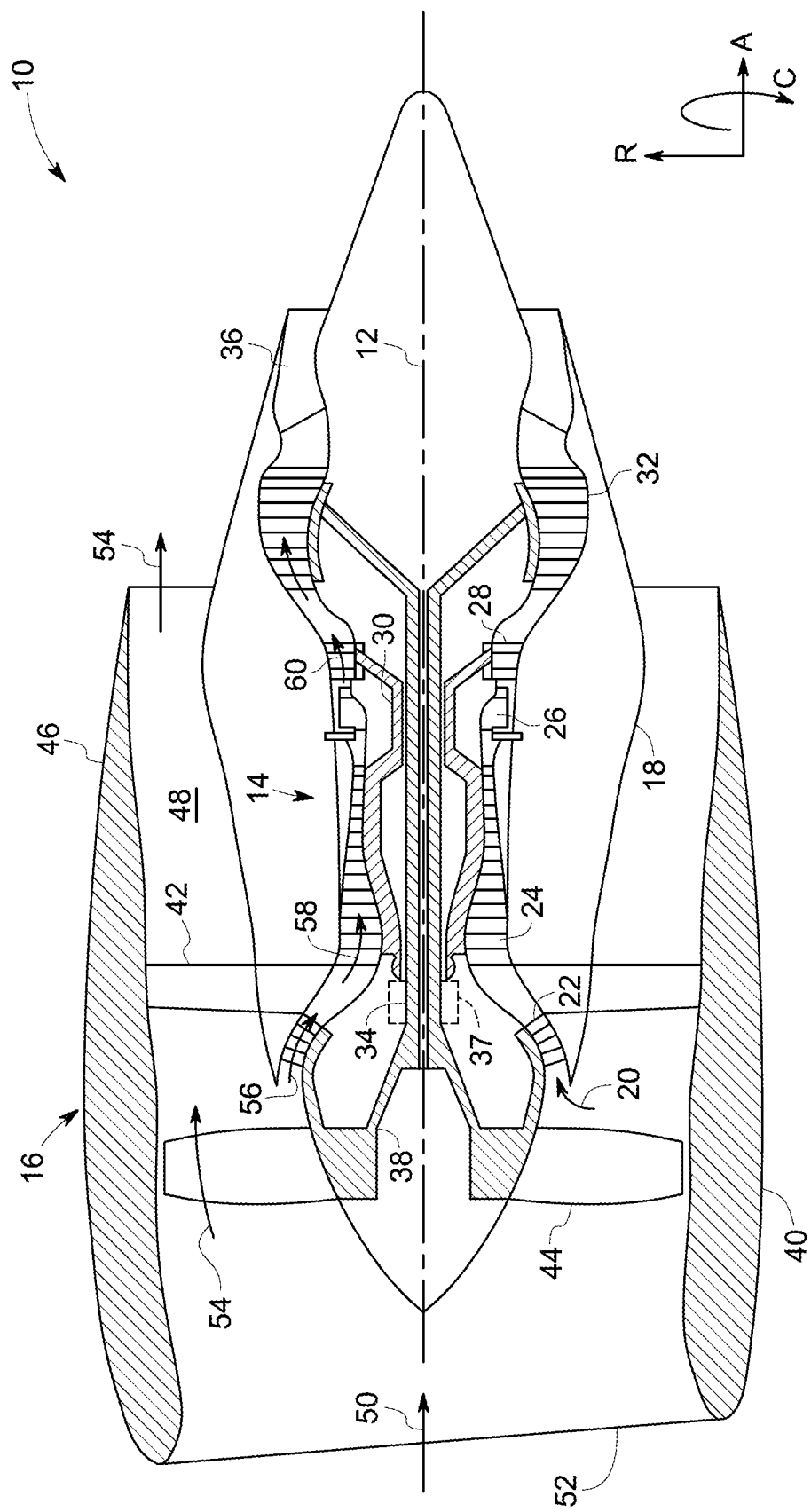
FIG. 1 illustrates a cross-sectional view of one embodiment of a gas turbine engine that may be utilized within an aircraft in accordance with aspects of the present disclosure.

Aspects and advantages of the invention will be set forth in part in the following description, or may be obvious from the description, or may be learned through practice of the invention.

Reference now will be made in detail to embodiments of the invention, some examples of which are illustrated in the drawings. Each example is provided by way of explanation of the disclosure, not limitation of the disclosure. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a rotor support system for supporting a rotor shaft of a gas turbine engine relative to a corresponding support frame of the engine. Specifically, in several embodiments, the system includes a bearing assembly and a support frame of the engine. A bearing support flange of the bearing assembly and a frame support flange of the support frame may be placed proximate to each other and fastened by a fastener. As used herein, a "bearing support flange" is a flange that is directly or indirectly coupled to a bearing of the bearing assembly and experiences the load during operation of the gas turbine engine. In a direct coupling, the bearing support flange may be in proximity to the bearing and in an indirect coupling, some other structural parts may be present in between the bearing support flange and the bearing. The "frame support flange" is a flange that is directly or indirectly coupled to the support frame and designed to support the bearing by taking maximum load from the bearing. The fastener is present between the bearing support flange and the frame support flange. In some embodiments, the fastener may extend beyond the bearing support flange and the frame support flange in the axial direction. The fastener is configured to fail when an excessive load is transmitted through the fastener, such as a load that exceeds a threshold load value of the fastener. The threshold value of the fastener may be predetermined based on the load exerted by the fastener during a normal operation of the rotor support system and the excess load exerted during an event such as a fan blade out (FBO) event. For example, the threshold value of the fastener is higher than the normal load value exerted by the fastener during a normal operation of the rotor support system and less than the highest load exerted on the fastener during an FBO event. An axial retainer is present as a part of the rotor support assembly. The axial retainer is configured to retain the bearing support flange and the frame support flange within an axial displacement from each other after the fastener fails.

In addition, the rotor support system includes a damping component including a super-elastic shape memory alloy (SMA). The damping component is in contact with at least one of the bearing support flange or the frame support flange. The damping component is configured to deform from a normal state to a deformed state after the fastener fails. The damping component used herein is a structural part that includes the super-elastic shape memory alloy. In some embodiments, the damping component is entirely made of the SMA. In some embodiments, the damping component includes a material that is non-super-elastic in nature along with an SMA, but the damping component, as a whole, exhibits at least some of the super-elastic properties, such as variable stiffness, high damping, or a combination thereof. The damping component is said to be in a "normal state" when the super-elastic shape memory alloy of the damping component is in its normal state. The deformation of the damping component provides very high damping of an excess load that is exerted by the bearing support flange in the event of high loads experienced by the rotor support system, such as in the case of a FBO event. The damping obtained by the presence of SMA is in general much higher when compared to any traditional dampers, as the damping obtained by the damping component that includes the SMA is a result of deformation of SMA through a phase transformation. This deformation of SMA provides high damping forces that reduces excess load transfer from the bearing support flange and the frame support flange. In addition, the SMA provides a high support stiffness under low or reduced loading conditions and low support stiffness under high or increased loading conditions. Such suitable properties of the shape memory alloy allow the recoverable relative motion of the damping component between the bearing support flange and the frame support flange while maintaining a mechanical connection between the bearing assembly and the support frame. After FBO, during a windmill, the properties of the shape memory alloy allow the bearing support flange to regain its original position and provides a desired amount of support stiffness between the bearing assembly and the support frame. In the normal state of the damping component, a radial gap exists between the bearing support flange and the frame support flange defining the available distance for the movement of the bearing support flange relative to the frame support flange during a deformation.

Referring now to the drawings, FIG. 1 illustrates a cross-sectional view of one embodiment of a gas turbine engine 10 that may be utilized within an aircraft with the engine 10 being shown having a longitudinal or axial centerline 12 extending therethrough. The engine 10 further has an axial direction A, a radial direction R, and a circumferential direction C for reference purposes. Accordingly, the terms "axial" and "axially" refer to directions and orientations that extend substantially parallel to a centerline 12 of an engine. The terms "radial" and "radially" refer to directions and orientations that extend substantially perpendicular to the centerline 12 of the engine. In addition, as used herein, the terms "circumferential" and "circumferentially" refer to directions and orientations that extend arcuately about the centerline of the engine.

In general, the engine 10 may include a core gas turbine engine 14 and a fan section 16 positioned upstream thereof. The core engine 14 generally includes a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 receives the pressurized air from the booster compressor 22 and further increase the pressure of such air. The pressurized air exiting the high-pressure compressor 24 flows to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high-pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Figure 2:
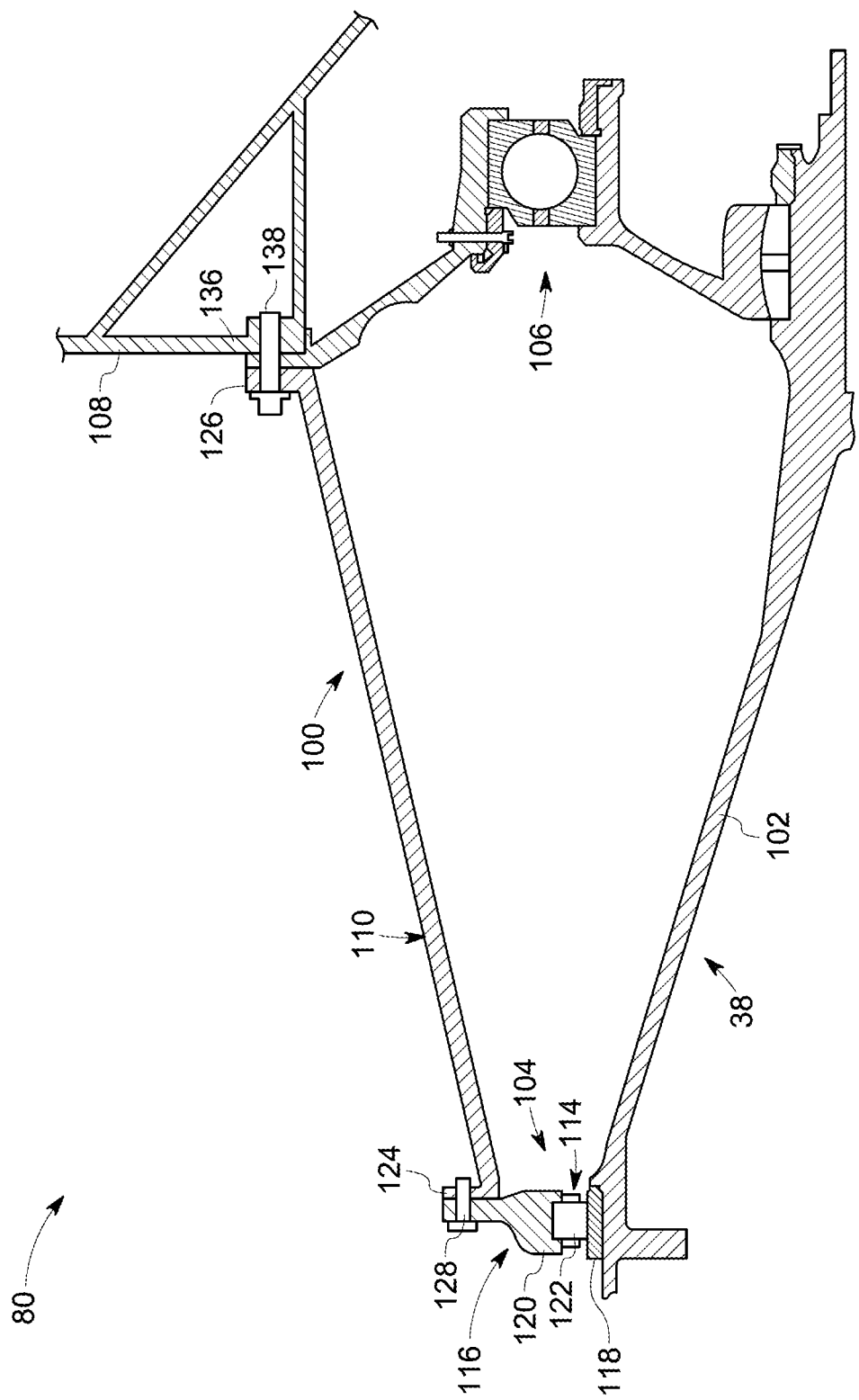
FIG. 2 illustrates a cross-sectional view of a part of the gas turbine system including a rotor support system for supporting a rotor shaft of the gas turbine engine relative to a corresponding support structure of the engine in accordance with aspects of the disclosure.

Additionally, as shown in FIG. 1, the fan section 16 of the engine 10 generally includes a rotatable, axial-flow fan rotor assembly 38 that is configured to be surrounded by an annular fan casing 40. The fan casing 40 may be configured to be supported relative to the core engine 14 by a plurality of substantially radially-extending, circumferentially-spaced outlet guide vanes 42. Additionally, a bearing support frame 108 (as shown in FIG. 2) may extend radially inwardly from the outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

In some embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, an initial air flow (indicated by arrow 50) enters the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high-pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10. In order to mitigate damage to the engine during events such as a FBO, in some embodiments, the fan casing 40 includes a trench extending circumferentially along an inner surface, the trench approximately axially aligned with the fan assembly (not shown in FIG. 1). Typically, the fan casing 40 also includes a trench filler layer positioned within the trench, the trench filler layer configured to dissipate an amount of impact energy from a released fan blade and including a plurality of sheets. Embodiments of the present disclosure are aimed at reducing the need for trench filler by mitigating or reducing the effect of fan blade out on an engine such as one illustrated in FIG. 1.

In FIG. 2, a cross-sectional view of a part 80 of the gas turbine engine 10 is illustrated. The part 80 includes a rotor support system 100 suitable for use within a gas turbine engine 10, installed relative to the fan rotor assembly 38 of the gas turbine engine 10. The rotor assembly 38 generally includes a rotor shaft 102 (e.g., shaft 34 shown in FIG. 1) configured to support an array of fan blades 44 (FIG. 1) of the rotor assembly 38 extending radially outwardly from a corresponding rotor disc (not shown). The rotor shaft 102 may be supported within the engine 10 through one or more axially spaced bearing assemblies 104, 106 of the rotor support system 100, with each bearing assembly 104, 106 being configured to rotationally support the rotor shaft 102 relative to a structural support frame 108 of the gas turbine engine 10. For instance, as shown in FIG. 2, a first bearing assembly 104 may be coupled between the rotor shaft 102 and the support frame 108 via a bearing cone 110 of the rotor support system 100, and hence, defines a load path for the load experienced due to the rotation of the rotor shaft 102 to the support frame 108. The bearing assembly 106 may be coupled between the rotor shaft 102 and the support frame 108 at a location axially aft of the first bearing assembly 104.

In several embodiments, the first bearing assembly 104 includes a bearing 114 and a bearing housing flange 116 extending radially outwardly from the bearing 114. In some embodiments, the bearing 114 is a roller bearing and may include an inner race 118, an outer race 120 positioned radially outwardly from the inner race 118 and a plurality of rolling elements 122 (only one of which is shown in FIG. 2) disposed between the inner and outer races 118, 120. The rolling elements 122 may generally correspond to any suitable bearing elements, such as balls or rollers. In the illustrated embodiment, the outer race 120 of the bearing 114 is formed integrally with the bearing housing flange 116. However, in other embodiments, the outer race 120 may correspond to a separate component from the outer bearing housing flange. In certain other embodiments, the bearing 114 may be a thrust bearing.

Figure 15:
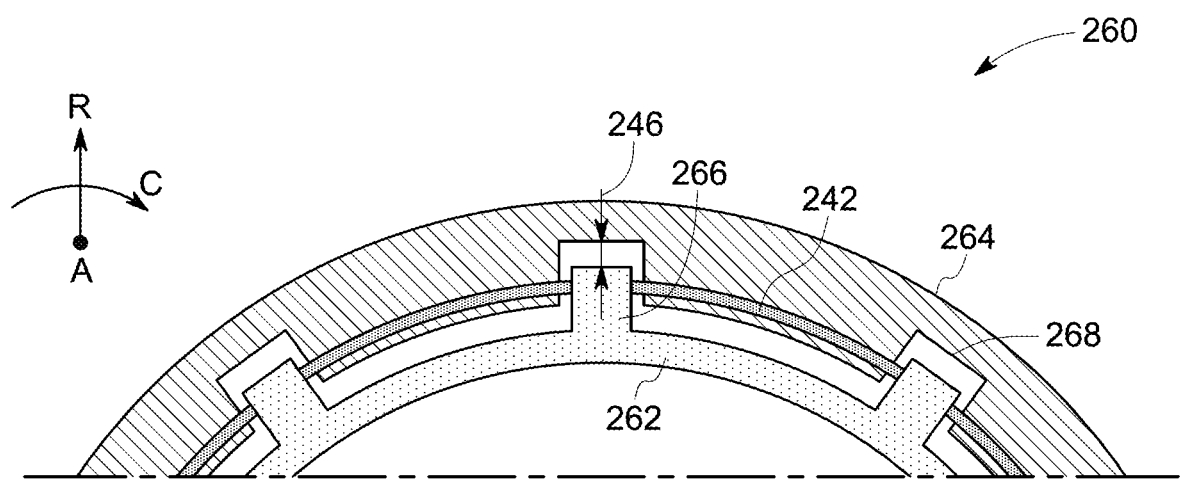
FIG. 15 is a schematic view of a rotor support system shown in FIG. 2 in accordance with some aspects of the present disclosure, illustrating two bearing cones and a damping component between the two bearing cones.

Additionally, as shown in FIG. 2, the bearing housing flange 116 is coupled to the bearing cone 110 of the disclosed system 100. The bearing cone 110 may have a forward mounting flange 124 and an aft mounting flange 126. The forward mounting flange 124 is coupled to the bearing housing flange 116 via a fastener 128, and the aft mounting flange 126 is coupled to a frame housing flange 136 of the support frame 108 via a fastener 138. The bearing support flange and the frame support flange may be located anywhere in the load path between the bearing 114 and the support frame 108. For example, in some embodiments, bearing support flange is same as the bearing housing flange 116. The bearing housing flange 116 is directly coupled to the bearing 114 and experiences the load from the bearing 114. In these embodiments, the frame support flange is the forward mounting flange 124 of the bearing cone 110, as the forward mounting flange 124 is indirectly coupled to the support frame 108 through the aft mounting flange 126 of the bearing cone 110 and the frame housing flange 136. The forward mounting flange 124 supports the bearing housing flange 116 and is designed to take load from the bearing housing flange 116. In some embodiments, bearing support flange is an aft mounting flange 126 of the bearing cone 110, and the frame support flange is the frame housing flange 136. In these embodiments, the aft mounting flange 126 of the bearing cone 110 is indirectly coupled to the bearing 114 and experiences the load transmitted through the coupling of the bearing housing flange 116 and the forward mounting flange 124 of the bearing cone. The frame housing flange 136 is directly attached to the support frame 108 and is designed to take the load from the aft mounting flange 126 of the bearing cone 110. In some embodiments, the bearing support flange and the frame support flange may be located anywhere between the forward mounting flange 124 and the aft mounting flange 126 of the bearing cone 110 (as illustrated in FIG. 15). It should be appreciated that, in the illustrated embodiment, the bearing housing flange 116 of the first bearing assembly 104 and the bearing cone 110 are shown as separate components configured to be coupled to one another and the bearing cone 110 and the support frame 108 are shown as separate components configured to be coupled to one another. However, in other embodiments, the bearing housing flange 116 and the bearing cone 110 or the bearing cone 110 and the support frame 108 may be formed integrally with one another. The "bearing support flange" and the "frame support flange" of the rotor support system 100 and method of operation of the rotor support system 100 are further explained in this disclosure through an example embodiment. The example embodiment denotes the bearing housing flange 116 as the bearing support flange and the forward mounting flange 124 of the bearing cone 110 as the frame support flange.

Figure 3:
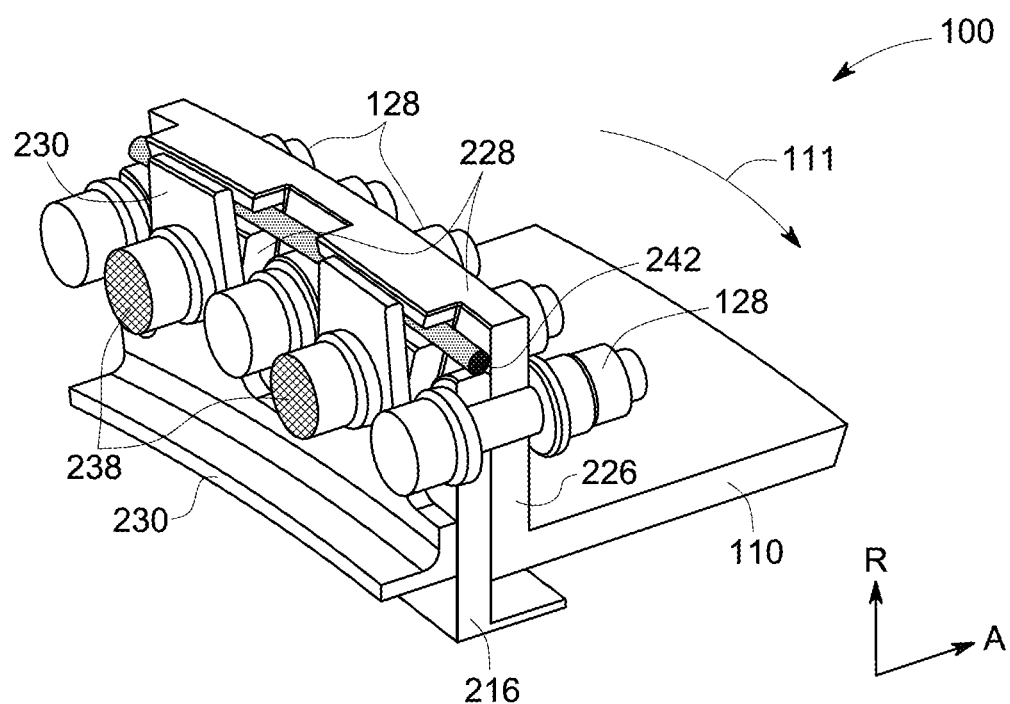
FIG. 3 illustrates a perspective view of a rotor support system, in accordance with some aspects of the present disclosure, illustrating a fastener, damping component, and an axial retainer.

Referring now to FIG. 3, a perspective view of one embodiment of a rotor support system 100 suitable for use within a gas turbine engine 10 is illustrated. As shown in FIG. 3, a fastener 128 is disposed between the bearing support flange 216 and the frame support flange 226. The fastener 128 engages bearing support flange 216 and the frame support flange 226. The fastener 128 may be positioned axially (i.e., in an axial direction A) or radially (i.e., in a radial direction R). In the embodiment shown in FIG. 3, the fastener 128 is an axial, fusible fastener. In general, the fastener 128 is configured to function as a load reduction device (LRD) for the disclosed rotor support system 100.

Specifically, in some embodiments, the fastener 128 is a fusible fastener by having a fuse portion that is configured to fail upon application of an excessive load through the fastener 128. For instance, during operation of the gas turbine engine 10, an imbalance within the engine 10 may cause significantly high radial forces to be applied through the fan section 16 of the engine 10 and into the bearing assembly 104 supporting the rotor assembly 38. If the radial force exceeds a given load threshold, the fastener 128 may fail, thereby severing the direct coupling provided between the bearing support flange 216 and the frame support flange 226 through the fastener 128. Typically, for a conventional LRD-type device, such a failure of the fastener 128 would result in the bearing support flange 216 being completely decoupled from the frame support flange 226. However, the disclosed system 100 herein includes one or more load recoupling means for maintaining the frame support flange 226 within a reasonable axial and radial distance from the bearing support flange 216.

In the rotor support system 100, the combination of the bearing support flange 216 and the frame support flange 226 are axially retained close to each other through an axial retainer 238. The axial retainer may be a retainer bolt, a retainer flange, a retainer block, or combinations thereof. The axial retainer is coupled to the frame support flange 226. The axial retainer 238 may be coupled to the frame support flange 226 through a permanent joining, through a compression fit, through one or more fastening means or through combination of any of the above coupling methods. FIG. 3 illustrates the axial retainer 238 coupling the frame support flange with a forward seal 230. In the illustrated embodiment, the axial retainer 238 is an axial retainer bolt coupling the forward seal 230 with the frame support flange 226 that is in the form of the forward mounting flange of the bearing cone 110. In another illustrated embodiment shown in FIG. 7, the axial retainer 238 is in the form of a retainer ring coupled to the frame support flange 226 through a clamping mechanism using a clamp structure 240 of the frame support flange 226, thereby aiding the retention of the bearing support flange 216 and the frame support flange 226 in the axial position by a compression fit.

Referring further to FIG. 3, the axial retainer 238 in the form of the axial retainer bolt is different from the fastener 128 in its position and function. While the fastener 128 couples the bearing support flange 216 and the frame support flange 226, and configured to fail after experiencing a certain level of load, the axial retainer 238 couples the frame support flange 226 to the forward seal 230 and is configured to axially retain the bearing support flange 216 and the frame support flange 226 axially close to each other, even in the event of experiencing high load. In some embodiments, the frame support flange 226 has an axially extended portion 228 that is disposed in radially outward direction of the bearing support flange 216. The axially extended portion 228 of the frame support flange 226 facilitates direct connection of the axial retainer 238 with the frame support flange 226. In some embodiments, a distal end 218 of the bearing support flange 216 is configured to have a corrugated shape (not visible in FIG. 3), thereby facilitating a direct axial coupling of the axial retainer 238 to the frame support flange 226.

As disclosed earlier, the rotor support system 100 includes a damping component 242 in contact with at least one of the bearing support flange 216 or the frame support flange 226. The damping component may be in the form of a circumferential ring, a plurality of radial struts, a plurality of solid blocks, a plurality of springs, a plurality of corrugated plates, or any combinations of any of these. In some embodiments, at least a portion of the damping component is in the form of a honeycomb structure. Further, there may be more than one SMA in the rotor support system 100 in more than one structural form. In some embodiments, the damping component is in contact with the bearing support flange 216, in some other embodiments, the damping component is in contact with the frame support flange 226. In some embodiments, the damping component is in contact with both the bearing support flange 216 and the frame support flange 226. In some embodiments, the damping component 242 is in contact with the frame support flange 226 and disposed between the bearing support flange 216 and the frame support flange 226, in a radial direction R, as shown in FIG. 3. In some embodiments, the damping component 242 is installed in a pre-stressed condition.

In the event of the rotor support system 100 working in nominal operation conditions, the damping component 242 may not have any considerable relative motion with respect to the bearing support flange 216 or the frame support flange 226 as fastener 128 shields the damping component 242 from the load experienced during normal operation. The SMA of the damping component 242 is in a normal state during normal operating condition of the rotor support system. In some embodiments, the SMA of the damping component 242 is in its austenite form in the normal state. An inherent, high body stiffness of the damping component 242 in the absence of any external load decreases the relative motion of the damping component 242. In the event of high loads experienced by the rotor support system, such as in the case of a FBO event, the fastener 128 fails and acts as a trigger for the damping component 242. When the fastener 128 fails, the bearing support flange 216 experiences a radial motion, exerts pressure on the damping component 242 and causes the damping component 242 to stretch in the radially outward direction R. Depending on the position of the high-load experienced in the rotor support system, the radial movement of the bearing housing flange may be non-uniform across the circumferential direction 111 (shown in FIG. 3 and FIG. 7) of the rotor system 100. In the embodiments having the damping component 242 in a circular ring shape, the ring may stretch to ovalize (e.g., take a shape of an oval) with its larger diameter in the direction that experienced higher pressure from radial movement of the bearing housing flange. As the load exerted by the damping component 242 exceeds the threshold value for the austenite to martensite transition of SMA included in the damping component 242, the stiffness of the damping component 242 decreases allowing its stretching and thereby damping of the load exerted. After the load recedes, during a post FBO windmill mode, due to the low load exerted on the damping component 242, the SMA of the damping component 242 assumes the austenite phase in its original or near original shape and returns to its normal state thereby making the damping component 242 to return to its normal state. In the normal state, the damping component 242 again provides a higher stiffness, thereby aiding reduction of the engine windmill response. In the absence of the damping component having an SMA, the engine windmill response is often severe due to a fan system mode after permanent decoupling of a traditional LRD. In some embodiments, unique position of the damping component 242 in the proximity of the bearing support flange 216 in radial direction during normal operating conditions and experiencing the load directly through the bearing support flange 216 in a high load imbalance position greatly reduces the load imbalance experienced by other structural parts of the rotor support system 100.

Figure 4:
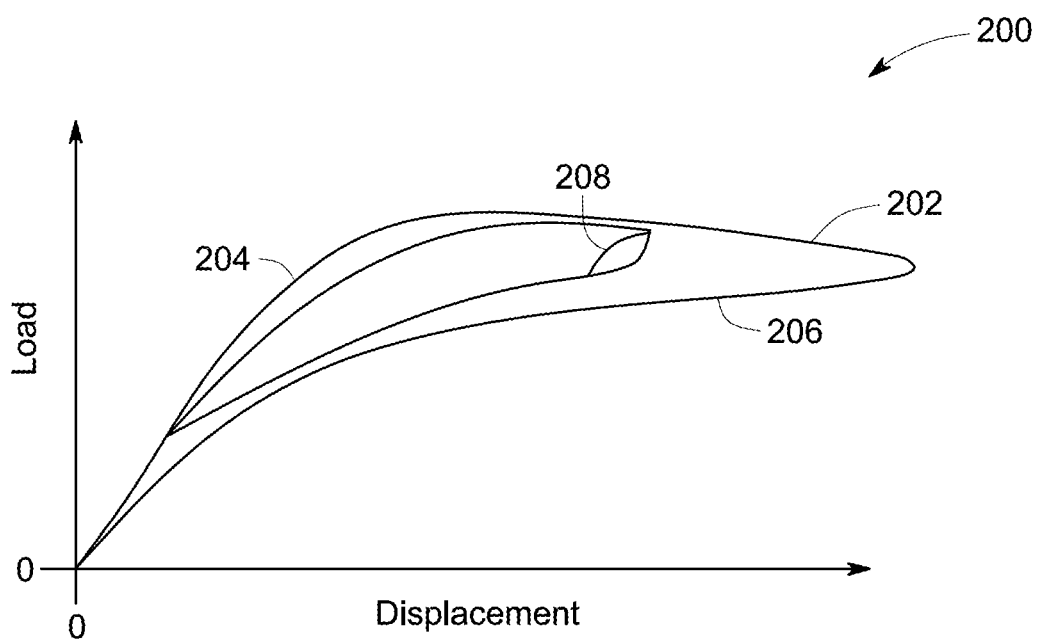
FIG. 4 is a plot depicting a load-deflection curve for a shape memory alloy material.

SMA material of the damping component 242 may, in certain embodiments, be alloys of nickel and/or titanium. For example, the SMA material may be alloys of Ni—Ti, or Ni—Ti—Hf, or Ni—Ti—Pd or Ti—Au—Cu. SMA presents non-linear behavior under mechanical stress, due to a reversible austenite/martensite phase change taking place within a crystal lattice of the SMA material. For example, as shown in FIG. 4, a plot 200 depicts a normal load-deflection curve 202 for a shape memory alloy. The load-deflection curve 202 follows a certain path 204 when stress is applied, and a different path 206 when the stress is relaxed. As the structure returns towards its initial shape as the stress is relaxed, the structure dissipates energy internally (hysteresis effect). Thus, when a SMA is subjected to repeated stresses, (e.g., because of dynamic vibration), it dissipates energy by hysteresis on each stress cycle. Accordingly, utilizing a damping component 242 in accordance with embodiments of the present disclosure may dissipate energy in hysteresis to reduce undesirable vibration.

In certain embodiments, the damping component 242 is disposed in a pre-stressed mode of the SMA. Installing the damping component 242 in the pre-stressed node of the SMA shifts the hysteresis cycle of the SMA to a range of stresses that is different from that of a non-pre-stressed SMA. For example, referring to plot 200, a load-deflection curve 208 is depicted for a prestressed SMA material. As depicted, the pre-stress serves to maximize the damping function of the damping component 242 so that the material is active at the maximum stresses generated. More particularly, placing the damping component 242 that includes the SMA in a pre-stressed mode may allow for the damping component 242 to enter a hysteretic bending regime, without requiring a relatively large amount of displacement.

Figure 5:
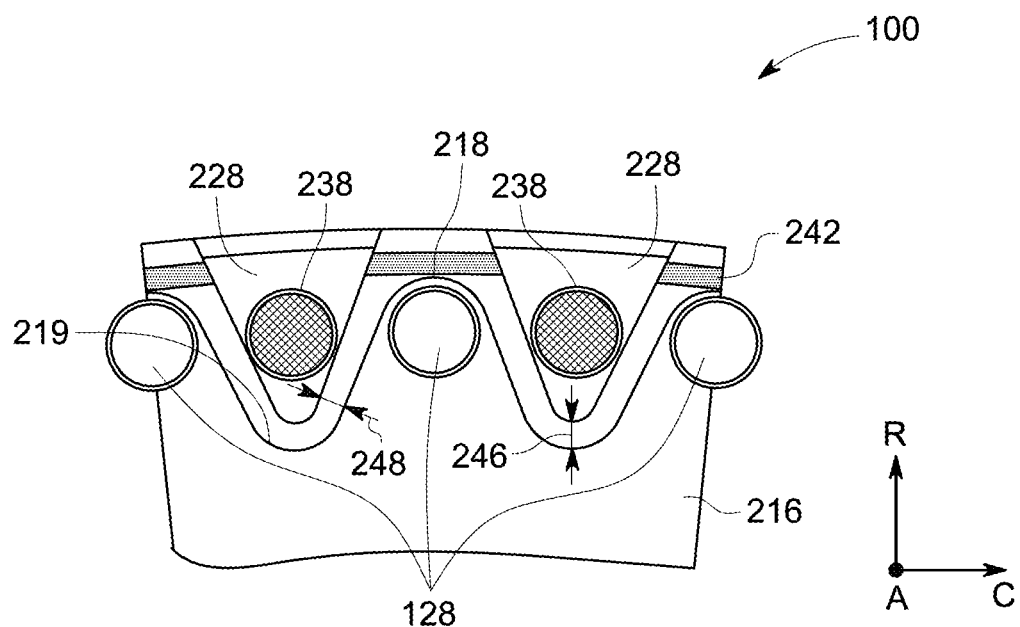
FIG. 5 is a schematic view of a rotor support system shown in FIG. 3 in accordance with some aspects of the present disclosure, illustrating a radial gap and a circumferential gap between the bearing support flange and the frame support flange.

The rotor support system 100 includes a radial gap 246 between the bearing support flange 216 and the frame support flange 226 when the damping component 242 is in the normal state. FIG. 5 illustrates the radial gap between the bearing support flange 216 and the frame support flange 226 illustrated in FIG. 3. In FIG. 5, the radial gap 246 is shown between a trough 219 in the corrugated shape of the radially distal end 218 of the bearing support flange 216 and the extended portion 228 of the frame support flange 226. This radial gap is desirable for allowing the radial movement of the bearing support flange 216 with damping effect without exerting very high pressure on the frame support flange 226 after the fastener 128 fails. Further, the radial gap 246 defines an upper limit to the radial displacement of the bearing support flange 216 from its normal operating condition and also with respect to the frame support flange 226. An absence of any radial gap 246 in the rotor support system 100 would result in a high force to be exerted by the bearing support flange 216 on the axial retainer 238 without any damping effect for the bearing support flange 216. The presence of the radial gap 246 allows the desired radial movement with the damping effect and also restricts the movement within desired limits. Due to relative motion of the bearing support flange 216 with respect to the frame support flange 226 during an FBO event, in some embodiments, the radial gap 246 between the bearing support flange 216 and the frame support flange 226 decreases in a direction along the movement of the bearing support flange 216. Therefore, in some embodiments, at least in some parts of the rotor support system, the radial gap 246 when the damping component is in the normal state is greater than a radial gap existing between the bearing support flange 216 and the frame support flange 226 when the damping component is in the deformed state. In some embodiments, at least a portion of the damping component 242 is disposed within the body of the extended portion 228 of the frame support flange 226, as shown in FIG. 3 and FIG. 5. In some embodiments, at least some portions of the damping component 242 is covered in the radial direction by the extended portion 228 of the frame support flange 226. In some embodiments, the radial movement of the bearing support flange 216 is such that the radial gap 246 between the bearing support flange 216 and the frame support flange 226 is closed at least in some part of the rotor support system 100. In some embodiments, further to having radial gap 246, there exists a circumferential gap 248 between the bearing support flange 216 and the frame support flange 226 when the damping component 242 is in the normal state, as illustrated in FIG. 5. The circumferential gap 248 facilitates and limits the radial and any desirable circumferential movement of the bearing support flange 216.

Figure 6:
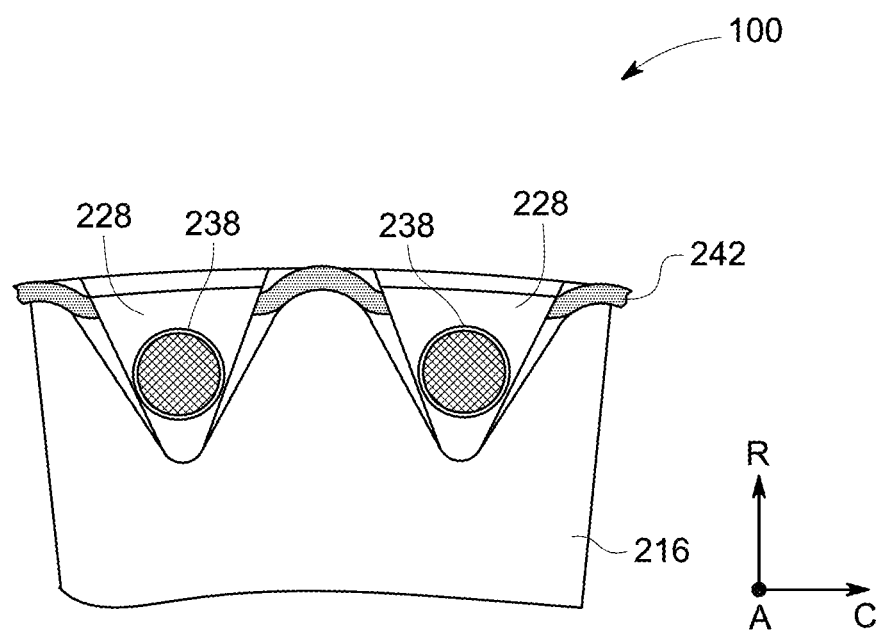
FIG. 6 is a schematic view of a rotor support system shown in FIG. 3 in accordance with some aspects of the present disclosure, illustrating closed radial gap and the circumferential gap between the bearing support flange and the frame support flange.

Thus, in some embodiments, the bearing support flange 216 is in radial contact with the frame support flange 226 when the damping component is in the deformed state, and the bearing support flange 216 in its maximum defected stage. FIG. 6 illustrates a rotor support system 100, in one embodiment, where the damping component 242 is in a deformed state and the bearing support flange 216 and the frame support flange 226 are in radial and circumferential contact with each other.

Along with the load reduction as discussed above, the design of the rotor support system described herein would produce relatively lower fan orbits, and would lead to reduction or elimination of heavy fan trench filler. Under normal operating conditions and during windmill, because of lower bearing loads, support stiffness would be at the designed high value, assuring safe normal operation and reduced vibrations under windmill. The design would further help in lowering fan orbits.

Figure 7:
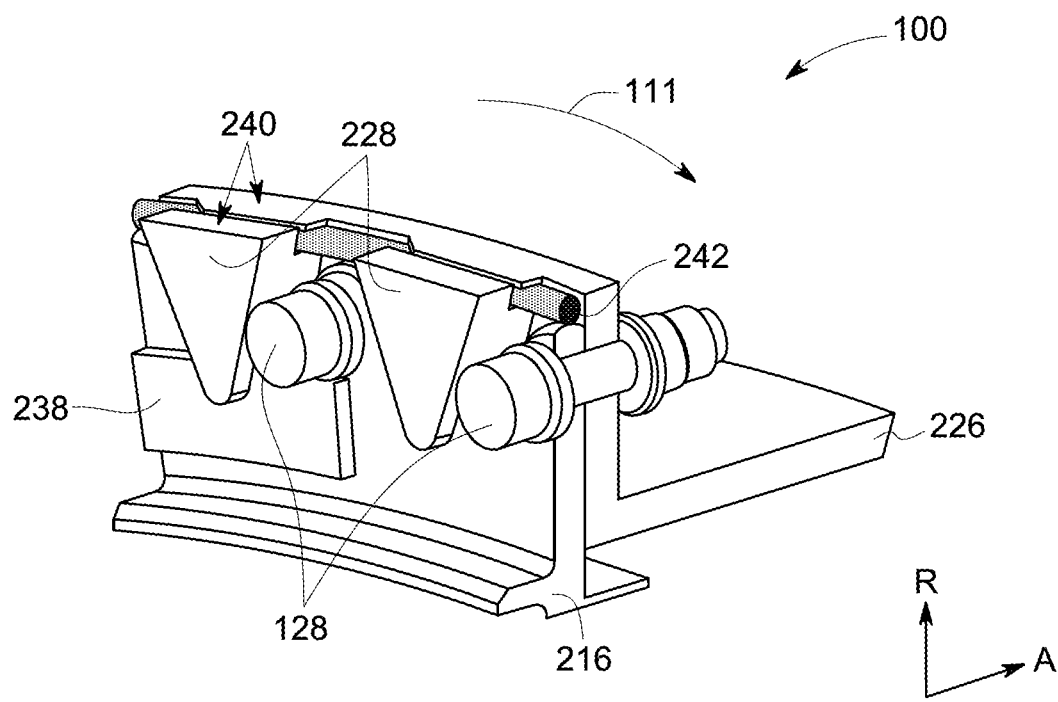
FIG. 7 illustrates a perspective view of a rotor support system in accordance with some aspects of the present disclosure, illustrating a fastener, damping component, and the axial retainer.

FIG. 7 illustrates an alternate embodiment of the rotor support system 100, wherein the axial retainer 238 is in the form of an axial ring that is connected to the frame support flange 226 through a compression fit between the extended portion 228 of the frame support flange 226 and the bearing support flange 216. In this kind of coupling between the axial retainer 238 and the frame support flange 226, there is no need of a forward seal or a flange for axially retaining the frame support flange 226.

Figure 8:
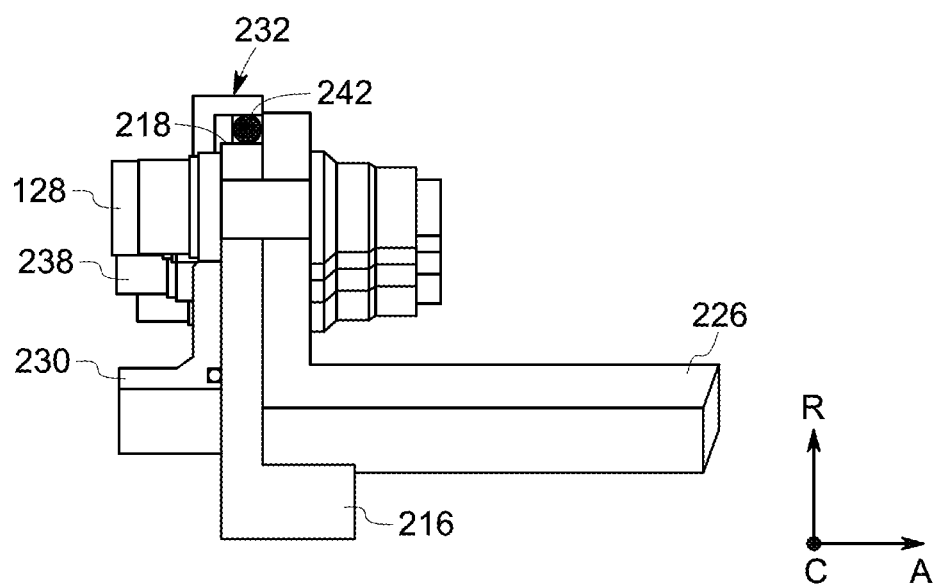
FIG. 8 illustrates a side view of a rotor support system in accordance with some aspects of the present disclosure, illustrating the fastener, damping component, and the axial retainer.

FIG. 8 illustrates yet another embodiment of the rotor support system 100. In FIG. 8, the rotor support system 100 includes the bearing support flange 216, frame support flange 226, axial retainer 238 in the form of an axial retainer bolt, fastener 128 between the bearing support flange 216 and the frame support flange 226 coupling the two, a damping component 242 disposed between the bearing support flange 216 and the frame support flange 226, a forward seal 230 coupled by the axial retainer 238 to the extended portion 228 of the frame support flange 226. The system further has a radial and circumferential gap between the bearing support flange 216 and the frame support flange 226. Further, in the embodiment illustrated in FIG. 8, at least some portions of the damping component 242 is covered in the radial direction by an extended portion 232 of the axial retainer 238. The distal end 218 of the bearing support flange 216 may have a corrugated shape as illustrated earlier in FIG. 5. While there is a radial gap between the bearing support flange 216 and the frame support flange 226, the radial gap is not shown in FIG. 8. The damping component 242 may be in the form of a circumferential ring, a plurality of radial struts, a plurality of solid blocks, a plurality of springs, a plurality of corrugated plates, or any combinations of any of these. In some embodiments, at least a portion of the damping component 242 is in the form of a honeycomb structure.

Figure 11:
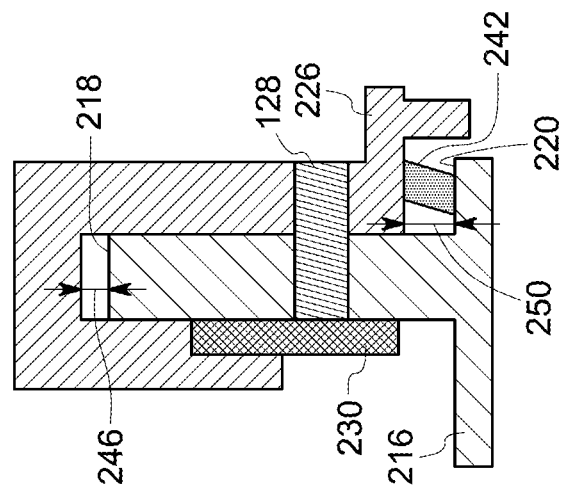
FIG. 11 illustrates a side view of a rotor support system in accordance with some aspects of the present disclosure, particularly illustrating the fastener, damping component, and the axial retainer.
Figure 10:
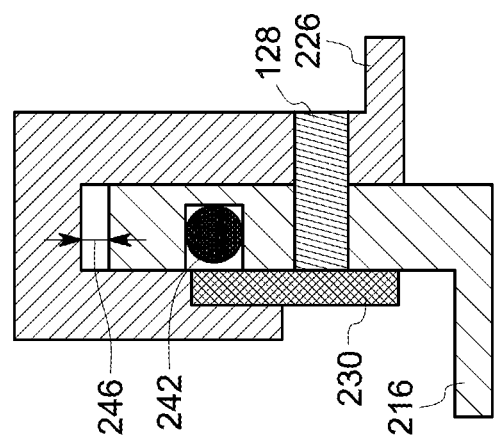
FIG. 10 illustrates a side view of a rotor support system in accordance with some aspects of the disclosure, illustrating the fastener, damping component, and the axial retainer.
Figure 9:
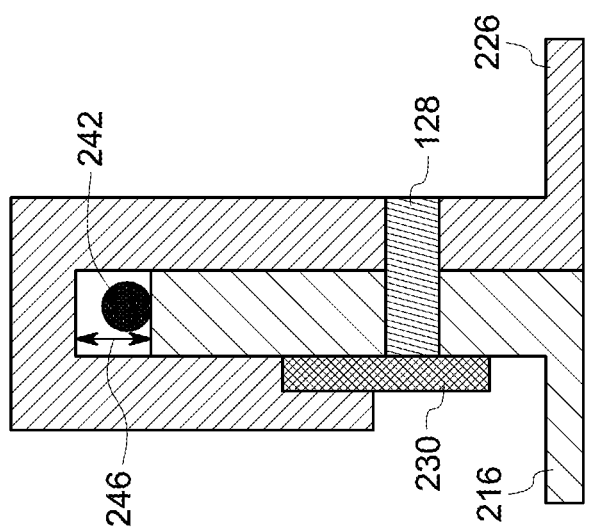
FIG. 9 illustrates a side view of a rotor support system in accordance with some aspects of the present disclosure, illustrating the fastener, damping component, and the axial retainer.

FIG. 9, FIG. 10, and FIG. 11, illustrate further illustrative embodiments of assembling the bearing support flange 216 and the frame support flange 226 to provide damping to the bearing support flange 216 in the rotor support system 100. In FIG. 9, the damping component 242 is disposed in contact with the bearing support flange 216, in the normal state. The radial gap 246 between the bearing support flange 216 and the frame support flange 226 defines the maximum radial displacement of the bearing support flange 216 during an FBO event. FIG. 10 illustrates an embodiment having the damping component 242 disposed within the body of the bearing support flange 216. During a high-load condition, the radial displacement of the bearing support flange 216 exerts force on the damping component 242, stretches the damping component 242, and thus provides damping effect, with a maximum radial movement of the bearing support flange defined by the radial gap 246. FIG. 11 illustrates an exemplary embodiment, wherein the damping component 242 is disposed between the bearing support flange 216 and the frame support flange 226, in alternate position 220 than proximate to the radially distal end (radial tip) 218 of the bearing support flange 216. The damping component 242 may be disposed in the form of plate, a spring, fin, a corrugated sheet metal, or any other shape that helps in damping the high load experienced by the bearing cone flange 216. The radial gap 246 may limit the radial movement of the bearing support flange 216. Depending on the design of the bearing support flange 216 and the frame support flange 226, the radial gap 246 may be present anywhere in the radial direction. For example, in FIGS. 9, 10, and 11, the radial gap 246 is shown between the frame support flange 226 and an outer diameter of the bearing support flange 216. In some other embodiments, depending on the design variation of the bearing support flange 216 or the frame support flange 226, the radial gap may be present in a radial position of the bearing support flange 216 that is less than the outer diameter of the bearing support flange 216. Alternately, depending on the shape change or deflection of the damping component 242, an alternate radial gap 250 between the bearing support flange 216 and the frame support flange 226 in the alternate position 220 of the bearing support flange may assume a minimum during high load exertion, which may act as the stopping point for the radial movement of the bearing support flange 216. A person skilled in the art would be able to make various combinations of the different embodiments illustrated herein through the various figures.

Figure 12:
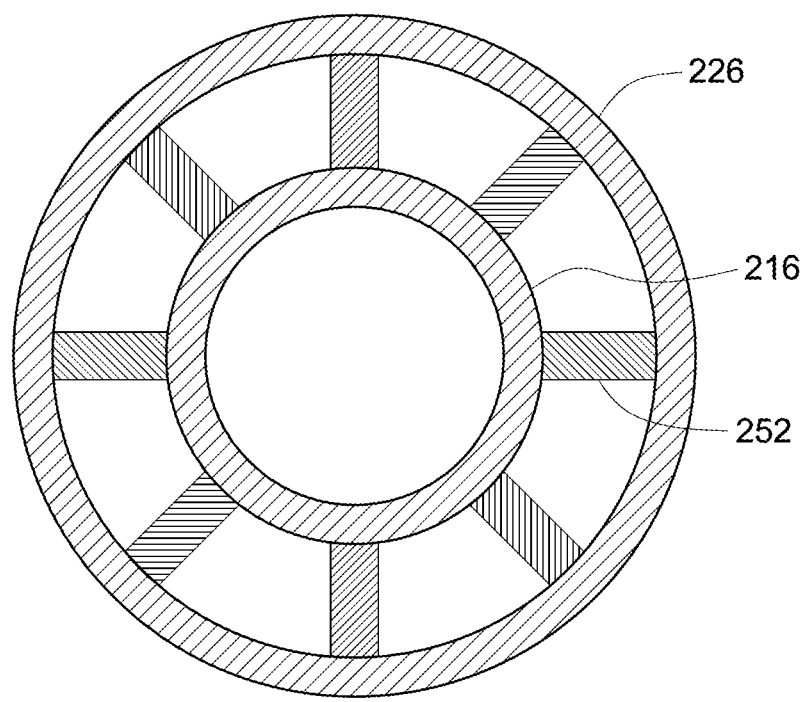
FIG. 12 is a schematic view of a rotor support system shown in FIG. 2 in accordance with some aspects of the present disclosure, illustrating the damping component in the form of radial struts.
Figure 13:
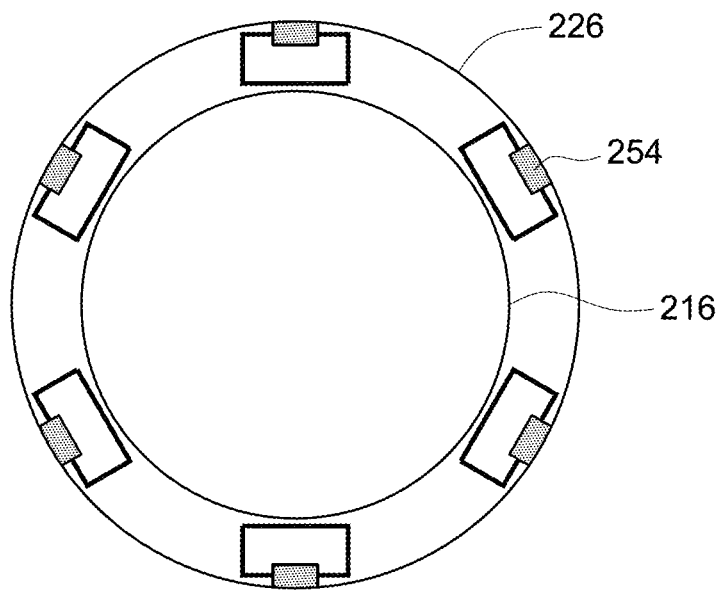
FIG. 13 is a schematic view of a rotor support system shown in FIG. 2 in accordance with some aspects of the disclosure, illustrating the damping component in the form of boxes.
Figure 14:
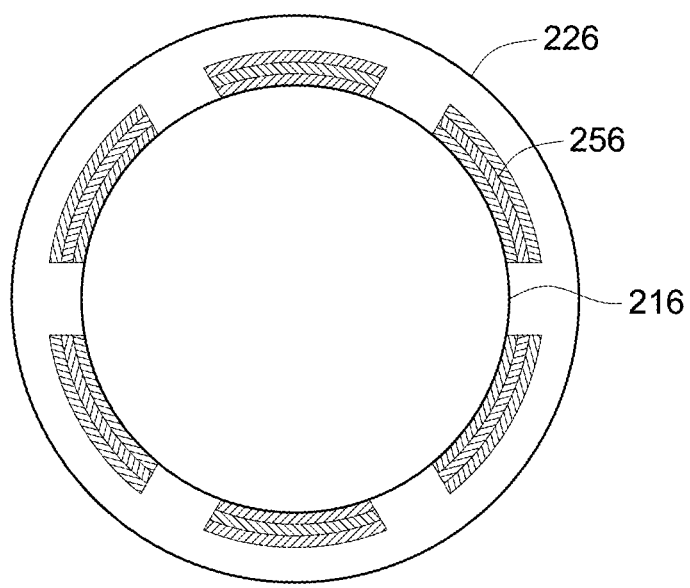
FIG. 14 is a schematic view of a rotor support system shown in FIG. 2 in accordance with some aspects of the present disclosure, illustrating the damping component in the form of corrugated plates.

FIG. 12, FIG. 13, and FIG. 14 illustrate various examples of the different forms of the damping component 242 that may be used in the rotor support system described herein. FIG. 12 illustrates the damping component 242 disposed in the form of radial struts 252 between the bearing support flange 216 and the frame support flange 226; FIG. 13 illustrates the damping component 242 disposed in the form of a box structure 254 between the bearing support flange 216 and the frame support flange 226; and FIG. 14 illustrates the damping component 242 disposed in the form of corrugated plates 256 between the bearing support flange 216 and the frame support flange 226.

FIG. 15 illustrates a front view of another example embodiment where the above-described positioning of the damping component 242, along with the radial gap 246 is desirable. FIG. 15 illustrates a double bearing cone structure 260 that has an inner bearing cone 262 having an inner bearing cone flange 266 and an outer bearing cone 264 having an outer bearing cone flange 268. The inner bearing cone 262 and the outer bearing cone 264 are connected with each other through the respective flanges 266 and 268 in a load path (bearing cone) 110 shown in FIG. 2. The inner bearing cone flange 266 and the outer bearing cone flange 268 are fastened to each other by a fastener as shown earlier in FIGS. 3, 7, 8-11. The fastener may be an axial or radial shear bolt. In some embodiments, the fastener is an axial fusible shear bolt. A damping component 242 is disposed between the flanges 266 and 268, and a radial gap 246 exists between the inner bearing cone flange 266 and the outer bearing cone flange 268. In some embodiments, the damping component 242 is be disposed in the radial gap between the inner bearing cone flange 266 and the outer bearing cone flange 268. In some embodiments, the damping component 242 is be disposed through the circumferential perforations in the outer bearing cone flange 268. During a high load event, such as an FBO event, the inner bearing cone 262 moves in radially outward direction thereby ovalizing the damping component 242. The damping by the damping component 242 reduces the amplitude of the inner bearing cone 262.

Figure 16:
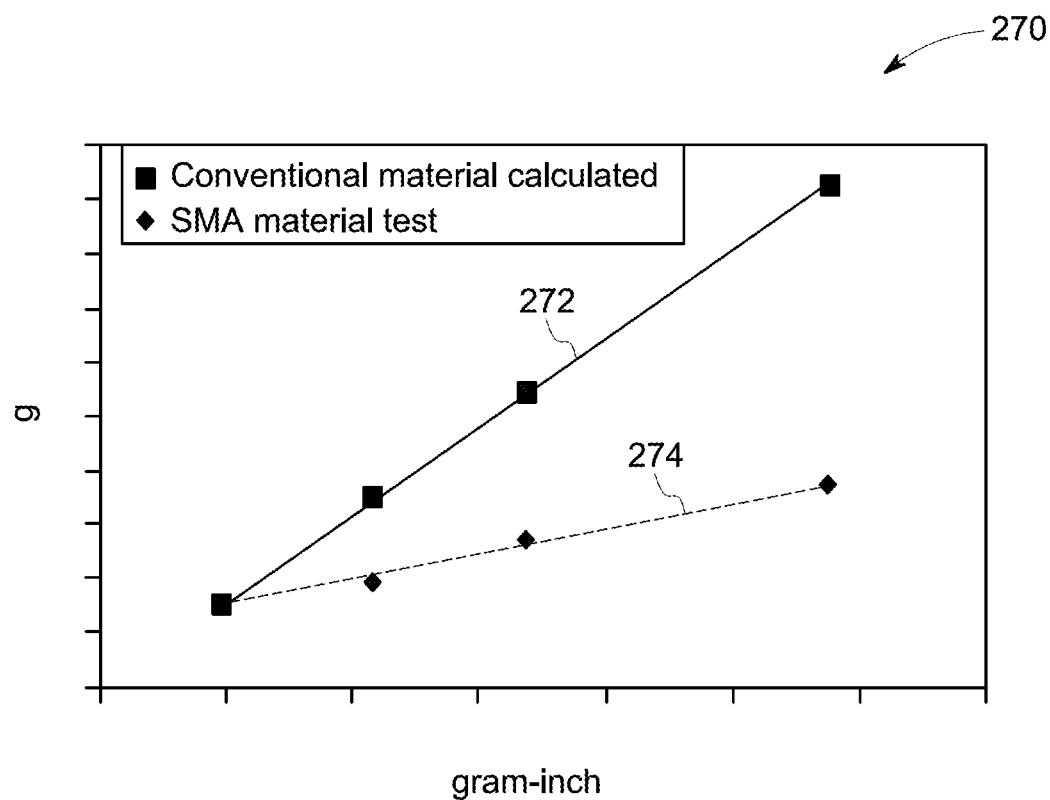
FIG. 16 illustrates a graphical comparison of acceleration of the bearing support flange in the absence of a damping component and in the presence of damping component in the rotor support system.

FIG. 16 provides a comparative graphical illustration 270 of the damping obtained by using a conventional damping material and a SMA. It can be seen that a support acceleration response 274 of the SMA is much less compared to the support acceleration response 272 of the conventional damping material. Thus, the SMA is found to be a better material than a conventional material for damping the loads in a high-load event such as a FBO event.

This written description uses some examples to disclose the claimed disclosure, including the best mode, to enable any person skilled in the art to practice the disclosure, including making and using any devices or systems and performing any incorporated methods. The scope of the claimed disclosure may include other examples that occur to those skilled in the art. Such other examples are intended to be within the scope of the appended claims if they have structural elements that do not differ from the literal language of the claims, or if they include equivalent structural elements with insubstantial differences from the literal language of the claims.

The invention claimed is:

1. A rotor support system for a gas turbine engine, the rotor support system comprising:
    a bearing support flange;
    a frame support flange proximate to the bearing support flange;
    a fastener between the bearing support flange and the frame support flange, the fastener configured to fail when a load on the fastener exceeds a threshold value;
    a damping component comprising a super-elastic shape memory alloy, wherein the damping component is in contact with at least one of the bearing support flange or the frame support flange, and configured to deform from a normal state to a deformed state after the fastener fails; and
    an axial retainer, the axial retainer configured to retain the bearing support flange and the frame support flange within an axial displacement from each other after the fastener fails,
    wherein a radial gap exists between the bearing support flange and the frame support flange when the damping component is in the normal state, the radial gap being greater when the damping component is in the normal state than when the damping component is in the deformed state.

2. The rotor support system of claim 1, wherein the damping component in the normal state provides a higher stiffness than the damping component in the deformed state.

3. The rotor support system of claim 1, wherein the bearing support flange is in radial contact with the frame support flange when the damping component is in the deformed state.

4. The rotor support system of claim 1, wherein the bearing support flange is a bearing housing flange, and the frame support flange is a forward mounting flange of a bearing cone.

5. The rotor support system of claim 1, wherein the bearing support flange is an aft mounting flange of a bearing cone, and the frame support flange is a frame housing flange.

6. The rotor support system of claim 1, wherein the fastener between the bearing support flange and the frame support flange is an axial, fusible fastener.

7. The rotor support system of claim 1, wherein the damping component is in contact with the frame support flange and disposed between the bearing support flange and the frame support flange.

8. The rotor support system of claim 1, wherein at least a portion of the damping component is disposed within a body of the bearing support flange.

9. The rotor support system of claim 1, further comprising a circumferential gap between the bearing support flange and the frame support flange.

10. The rotor support system of claim 1, wherein at least a portion of the damping component is in the form of a honeycomb structure.

11. The rotor support system of claim 1, wherein the damping component is in the form of a circumferential ring.

12. The rotor support system of claim 1, wherein the damping component is in the form of a plurality of radial struts, a plurality of solid blocks, a plurality of springs, or a plurality of corrugated plates.

13. The rotor support system of claim 1, wherein the axial retainer is a retainer bolt, a retainer flange, a retainer block, or combinations thereof.

14. The rotor support system of claim 1, wherein the bearing support flange is an inner bearing cone flange, and the frame support flange is an outer bearing cone flange.

15. A rotor support system for a gas turbine engine, the rotor support system comprising:
    a bearing support flange;
    a frame support flange proximate to the bearing support flange;
    a shear bolt fastening the bearing support flange and the frame support flange, the shear bolt configured to fail when a load on the shear bolt exceeds a threshold value;
    a damping component comprising a super-elastic shape memory alloy, wherein the damping component is in contact with at least one of the bearing support flange or the frame support flange, and configured to deform from a normal state to a deformed state after the shear bolt fails; and an axial retainer bolt fastened to the frame support flange, the retainer bolt configured to retain the bearing support flange and the frame support flange within an axial displacement from each other after the shear bolt fails, wherein a radial gap and a circumferential gap exist between the bearing support flange and the frame support flange when the damping component is in the normal state.

16. The rotor support system of claim 15, wherein the shear bolt is an axial fusible shear bolt, configured to fail when a load on the shear bolt exceeds a threshold value.

17. The rotor support system of claim 15, wherein the damping component is in contact with the frame support flange, and is disposed between the bearing support flange and the frame support flange.

18. The rotor support system of claim 15, wherein the damping component is in the form of a circumferential ring.

19. The rotor support system of claim 15, wherein the damping component is in the form of a plurality of radial struts, a plurality of solid blocks, a plurality of springs, or a plurality of corrugated plates.

20. The rotor support system of claim 15, wherein at least a portion of the damping component is in the form of a honeycomb structure.

21. A rotor support system for a gas turbine engine, the rotor support system comprising:
a bearing support flange;
a frame support flange proximate to the bearing support flange;
a fastener between the bearing support flange and the frame support flange, the fastener configured to fail when a load on the fastener exceeds a threshold value;
a damping component comprising a super-elastic shape memory alloy, wherein the damping component is in contact with at least one of the bearing support flange or the frame support flange, and configured to deform from a normal state to a deformed state after the fastener fails; and
an axial retainer, the axial retainer configured to retain the bearing support flange and the frame support flange within an axial displacement from each other after the fastener fails,
wherein a radial gap exists between the bearing support flange and the frame support flange when the damping component is in the normal state,
wherein the damping component is in contact with the frame support flange and disposed between the bearing support flange and the frame support flange.

* * * * *